United States Patent [19]

Tsuno et al.

[11] Patent Number: 4,784,574
[45] Date of Patent: Nov. 15, 1988

[54] TURBINE ROTOR UNITS AND METHOD OF PRODUCING THE SAME

[75] Inventors: Nobuo Tsuno, Kasugai; Minoru Matsui, Nagoya, both of Japan

[73] Assignee: NGK Insulators, Ltd., Nagoya, Japan

[21] Appl. No.: 27,042

[22] Filed: Mar. 20, 1987

Related U.S. Application Data

[63] Continuation of Ser. No. 700,103, Feb. 11, 1985, abandoned.

[30] Foreign Application Priority Data

Oct. 18, 1984 [JP] Japan ................................ 59-218884

[51] Int. Cl.$^4$ ................................................ F01D 5/28
[52] U.S. Cl. ............................ 416/241 B; 416/244 A; 403/30; 415/214
[58] Field of Search ........... 416/241 B, 244 R, 244 A, 416/204 A, 241 R; 415/214; 403/29, 30, 41, 179, 273; 417/407

[56] References Cited

U.S. PATENT DOCUMENTS

| | | | |
|---|---|---|---|
| 1,940,870 | 12/1933 | Litton | 416/241 B X |
| 2,933,386 | 4/1960 | Pessel | 75/224 |
| 3,604,819 | 9/1971 | Krahe et al. | 416/244 R X |
| 3,801,226 | 4/1974 | Bevan et al. | 415/214 X |
| 4,123,199 | 10/1978 | Shimizu et al. | 416/241 B X |
| 4,176,519 | 12/1979 | Kronogard | 416/241 B X |
| 4,214,906 | 7/1980 | Langer et al. | 75/208 R |
| 4,256,441 | 3/1981 | Arora | 417/407 |
| 4,279,576 | 7/1981 | Okano et al. | 417/407 |
| 4,281,941 | 8/1981 | Rottenkolber | 416/241 B X |
| 4,325,647 | 4/1982 | Maier et al. | 403/29 |
| 4,341,826 | 7/1982 | Prewo et al. | 428/35 |
| 4,404,935 | 9/1983 | Kraft | 92/224 X |
| 4,424,003 | 1/1984 | Brobeck | 416/241 B |
| 4,479,293 | 10/1984 | Miller et al. | 416/241 R X |
| 4,479,735 | 10/1984 | Thompson et al. | 416/244 R X |
| 4,492,737 | 1/1985 | Conolly | 428/552 |
| 4,503,009 | 3/1985 | Asaka | 419/6 |
| 4,518,315 | 5/1985 | Kruger | 416/241 B X |
| 4,548,786 | 10/1985 | Yohe | 419/29 |

FOREIGN PATENT DOCUMENTS

| | | |
|---|---|---|
| 2457231 | 12/1976 | Fed. Rep. of Germany . |
| 2845716 | 4/1980 | Fed. Rep. of Germany . |
| 58-214018 | 12/1983 | Japan . |
| 61-3901 | 1/1986 | Japan . |
| 2104551 | 3/1983 | United Kingdom . |

OTHER PUBLICATIONS

European Search Report-EP 85 30 0976-3 pgs.
Japanese Patent Abstract, vol. 8, No. 220 (M-330) (1957).

*Primary Examiner*—Robert E. Garrett
*Assistant Examiner*—Joseph M. Pitko
*Attorney, Agent, or Firm*—Parkhurst, Oliff & Berridge

[57] ABSTRACT

A turbine rotor unit and a method of producing the same are disclosed. This turbine rotor unit comprises a ceramic rotor, a ceramic shaft integrally united with the ceramic rotor and a metal shaft provided with a cylindrical portion fixing the ceramic shaft therein and is characterized by having a gap between a substantial portion of the inner peripheral surface of the cylinder portion located near the side of the ceramic rotor and the outer surface of the ceramic shaft. Further, the turbine rotor unit is produced by arranging on one end of the metal shaft a cylindrical portion wherein an inner diameter at its opening side is larger than that at the bottom side, inserting the ceramic shaft into the cylindrical portion, and fixing the ceramic shaft to the cylindrical portion at its small diameter side.

16 Claims, 1 Drawing Sheet

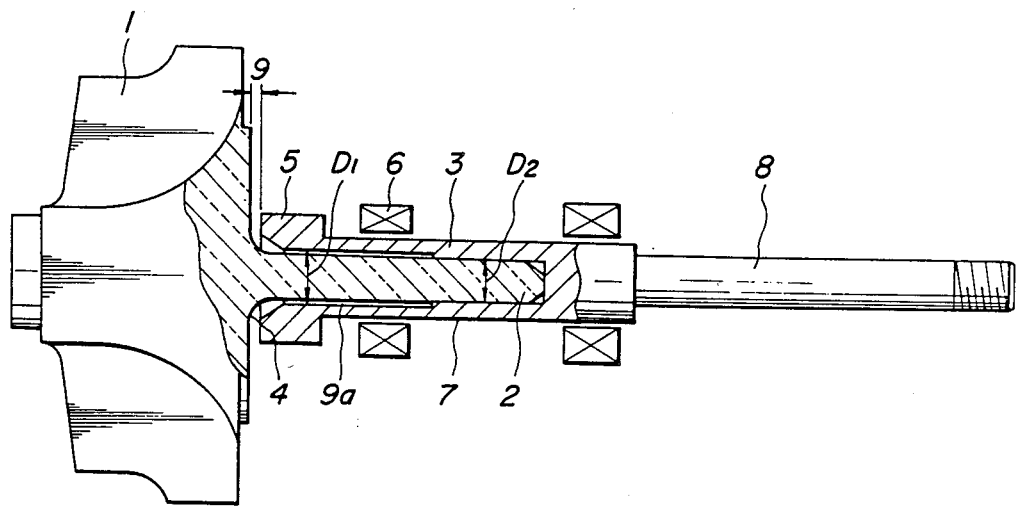
FIG_1
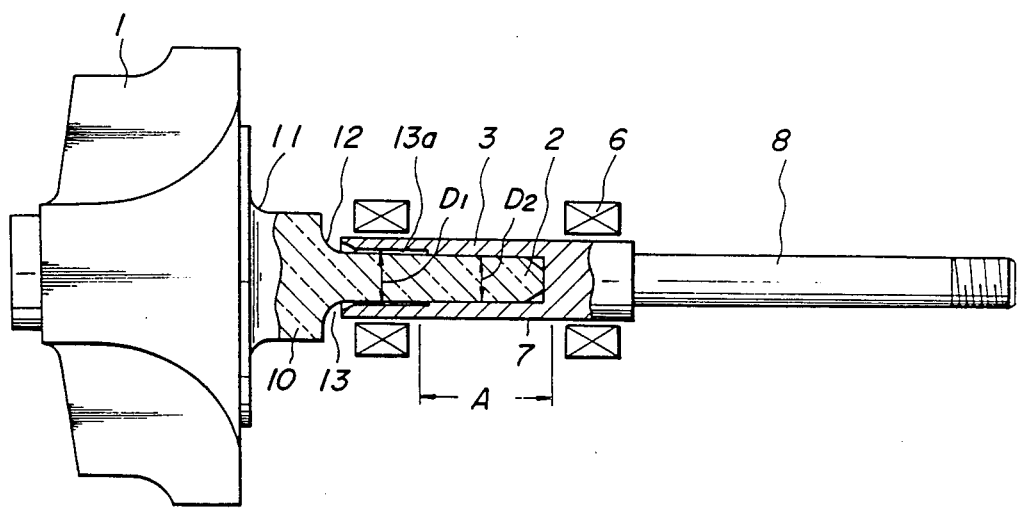
FIG_2

TURBINE ROTOR UNITS AND METHOD OF PRODUCING THE SAME

This is a continuation of application Ser. No. 700,103 filed Feb. 11, 1985, now abandoned.

BACKGROUND OF THE INVENTION

1. Field of the Invention:

This invention relates to a turbine rotor unit and a method of producing the same. More particularly, it relates to a turbine rotor unit made from metal and ceramic and a method of producing the same.

2. Description of the Prior Art:

Since ceramic materials are hard and have excellent abrasion resistance as well as mechanical properties and corrosion resistance at high temperature, they are suitable as a structural material for a rotor unit of gas turbine engine and turbocharger requiring high mechanical strength and abrasion resistance at high temperatures. Therefore, it is desirable to make the rotor unit of gas turbine engine or turbocharger from a ceramic material. For instance, U.S. Pat. No. 4,396,445 discloses a turbine rotor unit comprising a ceramic rotor and a ceramic shaft. In the turbine rotor unit of this structure, a threaded portion is provided on one end of the ceramic shaft, through which a metallic impeller is fixed. However, this turbine rotor unit has a drawback that the threaded portion of the ceramic shaft fracture in use due to the difference in thermal expansion between the ceramic material constituting the shaft and the metal material constituting the impeller. Further, the threading work for the ceramic material needs much manual skill, which requires long time and high cost.

As a countermeasure for the above, a turbine rotor unit having a structure that the ceramic shaft is fitted into a cylindrical portion disposed on an end of a metal shaft is disclosed in Japanese Utility Model laid open No. 57-92,097. In this structure, however, the tip of the cylindrical portion in the metal shaft is located between two bearings supporting the shaft of the turbine rotor unit, so that there is a fear of lubricant leaking from a bearing housing into a turbine housing when the ceramic shaft of the turbine rotor unit is broken.

Moreover, U.S. Pat. No. 4,424,003 and its corresponding German Patent Specification No. 2,728,823 disclose a turbine rotor unit having a structure that the whole length of the ceramic shaft in the rotor unit is covered with a hollow metal shaft. In this structure, however, the ceramic shaft is closely fixed to the inner surface of the hollow metal shaft over substantially the whole length of the ceramic shaft, so that the heat transfer area from the ceramic shaft to the metal shaft becomes large. As a result, the quantity of heat transferred from the high temperature turbine rotor to the metal shaft increases to excessively raise the temperature of the metal shaft, which is apt to degrade a sealing and fitting mechanism arranged on the metal shaft and to seize a bearing.

Furthermore, a shearing stress is produced at the fitting boundary between the metal shaft and the ceramic shaft due to the difference in thermal expansion therebetween accompanied with a rise in temperature of the metal shaft, which is capable of causing fatigue of the metal shaft. And also, the temperature of the lubricant excessively rises because the quantity of heat transferred to the metal shaft is large.

In addition, there is a large temperature gradient in an axial direction at the fitting portion between the hollow metal shaft and the ceramic shaft because the temperature of the fitting portion side of a turbine rotor is high and that of the fitting portion inside a lubricating unit is low. As a result, a tensile thermal stress in an axial direction is produced on the surface of the ceramic shaft in the fitting portion to cause breaking of the ceramic shaft.

Moreover, it is required to apply a highly precise machining to the outer peripheral surface of the ceramic shaft and the inner peripheral surface of the hollow metal shaft in order that the ceramic shaft is fixed to the hollow metal shaft over substantially the whole length thereof in a direct contact state, which results in manufacturing problems.

SUMMARY OF THE INVENTION

It is, therefore, an object of the invention to minimize the quantity of heat transferred from a ceramic shaft to a metal shaft in a turbine rotor unit comprising a combination of the ceramic shaft and the metal shaft so as to prevent the degradation of a sealing mechanism for a lubricant and the seizure of a bearing.

It is another object of the invention to prevent or minimize the leakage of lubricant when the ceramic shaft is broken.

It is a further object of the invention to provide a strongly fixed turbine rotor unit and a method of producing the same which is easy to produce.

It is a still further object of the invention to provide a turbine rotor unit having a high reliability without any breaking of the ceramic and metal shafts and a method of producing the same.

According to a first aspect of the invention, there is provided in a turbine rotor unit comprising a ceramic turbine rotor, a ceramic shaft integrally united with said ceramic rotor and a metal shaft provided with a cylindrical portion fixing said ceramic shaft therein, the improvement which comprises a gap between a substantial portion of the inner peripheral surface of said cylindrical portion of the metal shaft located near the side of said ceramic rotor and the outer surface of said ceramic shaft.

Preferably, the shape of the gap is cylindrical having a substantial longitudinal depth, and more preferably the depth is larger than the diameter of the ceramic shaft.

According to a second aspect of the invention, there is provided a method of producing a turbine rotor unit by fixing a ceramic shaft integrally united with a ceramic turbine rotor to a metal shaft, which comprises arranging on one end of said metal shaft a cylindrical portion wherein an inner diameter at its opening side is larger than that at the bottom side, inserting said ceramic shaft into said cylindrical portion, and fixing said ceramic shaft to said cylindrical portion at its small diameter side.

BRIEF DESCRIPTION OF THE DRAWINGS

The invention will be described with reference to the accompanying drawings, wherein:

FIGS. 1 and 2 are side elevations, partly shown in section, of the turbine rotor unit for a turbocharger as an embodiment of the turbine rotor unit according to the invention, respectively.

DETAILED DESCRIPTION OF THE INVENTION

According to the invention, the turbine rotor unit is produced by arranging on one end of the metal shaft a cylindrical portion having an inner diameter at its opening side larger than that at the bottom side, inserting the ceramic shaft integrally united with the ceramic rotor into the cylindrical portion, and fixing it to the cylindrical portion at its small diameter side. In this case, it is favorable that the fixed region between the ceramic shaft and the cylindrical portion of the metal shaft is located in that region of the rotor shaft which has a temperature of not more than 500° C., preferably not more than 350° C. during use thereof. Furthermore, it is desirable that the temperature gradient in an axial direction is not existent in the fixed region.

In general, the coefficient of thermal expansion of metals is larger than that of ceramic materials. When the shaft portion of the turbine rotor unit according to the invention is composed of metal and ceramic, if the temperature of the shaft portion exceeds 500° C., the bonding force in the fixed region unfavorably lowers due to the difference in thermal expansion, between the metal and the ceramic. Further, if the temperature gradient in an axial direction is existent in the fixed region, a tensile thermal stress is produced in the ceramic shaft at the bonding boundary between the ceramic shaft and the cylindrical portion of the metal shaft which results in breaking of the ceramic shaft.

In order to solve the above problems, when the turbine rotor unit according to the invention is applied to, for example, a turbocharger rotor, it is desirable that the fixed region (i.e., a contact surface area) between the ceramic shaft and the cylindrical portion of the metal shaft be located in a bearing housing, preferably between two portions contacting with two bearings for supporting the shaft part of the turbine rotor unit. Thus, the fixed region between the ceramic shaft and the cylindrical portion is forcebly cooled by a lubricant circulating in the bearing housing, so that an excessive rise in temperature and a large temperature gradient in an axial (or longitudinal) direction in the fixed region do not result, whereby the reduction of the bonding force between the ceramic shaft and the cylindrical portion and the occurrence of tensile thermal stresses at the bonding boundary therebetween are ameliorated.

In the turbine rotor unit according to the invention, a longitudinally extending radial gap having a heat insulating effect is formed between the inner peripheral surface of the cylindrical portion of the metal shaft extending from the fixed region toward a turbine rotor side and the outer peripheral surface of the ceramic shaft. The presence of the gap minimizes the heat transfer from the ceramic shaft to the cylindrical portion of the metal shaft even when the temperature of the ceramic shaft rises, which minimizes excessive temperature in the metal shaft. As a result, the loosening of the fixed region, the breaking of the ceramic shaft by thermal stress and the seizure of the bearing do not result even when the temperature of the turbine rotor rises. In the turbine rotor unit according to the invention, therefore, it is possible to extend the tip of the cylindrical portion of the metal shaft near the turbine rotor and consequently all of the elements required for the attachment and sealing of the lubricant can be arranged on the outer peripheral surface of the cylindrical portion, whereby the leakage of the lubricant is prevented even if the ceramic shaft breaks.

According to the invention, the fixing of the ceramic shaft to the metal shaft in the turbine rotor unit can be carried out by known fitting and joining method.

Among these methods, the fitting may be performed by any know of shrink-fitting, expansion-fitting and press-fitting. The shrink-fitting and expansion-fitting are suitable for the production of the turbine rotor unit wherein the size of the fitting portion is large because they utilize the fittable size difference produced after one of two members to be fitted is heated or cooled.

Since the coefficient of thermal expansion of the metallic material is generally larger than that of the ceramic material, as previously mentioned, and also, the diameter of the ceramic shaft is slightly larger than the inner diameter at the small diameter side of the cylindrical portion of the metal shaft, according to the invention, the shrink-fitting by heating of the metal is preferable because the large fittable size difference can stably be obtained at a small temperature difference between the metal and the ceramic. Moreover, the interference in the shrink-fitting and the expansion-fitting is sufficient to provide a tightness so as not to break the cylindrical portion and ceramic shaft after the fitting and required in the fitting portion under service conditions for the turbine rotor unit according to the invention.

On the other hand, the press-fitting is carried out by forcebly pushing the ceramic shaft into the cylindrical portion of the metal shaft having an inner diameter smaller than the diameter of the ceramic shaft under loading. The difference between the diameter of the ceramic shaft and the inner diameter of the cylindrical portion is absorbed by the deformation of the cylindrical portion, so that the finishing tolerance limits of the diameter of the ceramic shaft and the inner diameter of the cylindrical portion before the press-fitting may be larger than that in the shrink-fitting and expansion-fitting. Therefore, the press-fitting is suitable for the production of the turbine rotor unit wherein the size of the fitting portion is small. In this case, the shape and size of the press-fit portion are so made that the ceramic shaft and the cylindrical portion of the metal shaft are not broken under a loading applied during the press-fitting. Further, the difference in the size between the diameter of the ceramic shaft and the inner diameter at the small diameter side of the cylindrical portion is so determined that the press fit portion has a tightness required under service conditions of the turbine rotor unit according to the invention. For this purpose, the size difference must satisfy the condition that the diameter of the ceramic shaft is larger by 0.1–10%, preferably 1–5% than the inner diameter at small diameter side of the cylindrical portion. When the size difference is less than 0.1%, the tightness in the press fit portion is not sufficient and there is a fear of loosening of the press-fitted ceramic shaft from the cylindrical portion in use. While, when the size difference exceeds 10%, the ceramic shaft and/or the cylindrical portion can break during press-fitting. Moreover, the stable tightness is obtained by making the size difference large when the hardness of the cylindrical portion is low or small when the hardness is high. The press-fitting may be carried out at room temperature or by heating only the metal shaft or both the metal and ceramic shafts. In this case, the press-fitting by the heating of both shafts is most preferable because the heating of both shafts decreases the deformation resistance of the cylindrical portion of the metal shaft to reduce the loading required in the press-fitting and consequently the breaking of the ceramic shaft and the cylindrical portion does not result and also the increase of tightness based on the difference in thermal expansion therebetween is caused in the cooling from the press-fitting temperature. When the press-fitting is carried out by heating both the ceramic and metal shafts, it is preferable that the press-fitting temperature is not higher than a low-side temperature in either of the heat treating temperature of the metal shaft and the softening temperature of the surface hardened layer of the metal shaft but not lower than the service temperature of the press fit portion.

The term "heat treating temperature of metal shaft" used herein means a temperature in the heat treatment for adjusting the hardness of the cylindrical portion of the metal shaft. For instance, the heat treating temperature corresponds to a precipitation hardening temperature when the cylindrical portion is made from a precipitation hardened alloy, or to a tempering temperature when the cylindrical portion is made from a quench hardened steel.

On the other hand, the softening temperature of the surface hardened layer corresponds to a softening temperature of a nitride layer when the surface hardening is carried out by a nitriding treatment, or to a tempering temperature in the case of surface quenching.

When the press-fitting temperature is higher than the tempering temperature of the metal shaft, the hardness of the metal shaft is unfavorably decreased to reduce the tightness in the press fit portion. While, when the press-fitting temperature is higher than the softening temperature of the surface hardened layer, the effect of the surface hardening treatment lowers undesirably. And also, when the press-fitting temperature is higher than the precipitation hardening temperature of the metal shaft, the metal shaft is hardened during heating to reduce the ductility and consequently the ceramic shaft and cylindrical portion are unfavorably broken.

When the press-fitting temperature is lower than the service temperature of the press fit portion, if the temperature of the press fit portion is raised to its service temperature, the tightness is decreased due to the loosening of the press fit portion because the thermal expansion of the metal shaft is generally larger than that of the ceramic shaft.

In the turbine rotor unit according to the invention, the ceramic shaft may be joined to the metal shaft through adhesion with a heat-resistant adhesive or brazing. In the case of brazing, a metal layer is previously formed on a surface portion of the ceramic shaft to be joined. The formation of the metal layer may be carried out by a method wherein a paste-like composition consisting essentially of powdery metal is applied to the surface of the ceramic shaft and then dried and baked, or by a method wherein metal is deposited on the surface of the ceramic shaft through physical or chemical evaporation, or the like. The joining between the metal shaft and the ceramic shaft provided with the metal layer may be carried out according to the usual manner using a commercially available brazing alloy. In addition to the above method, the ceramic shaft can directly be joined to the metal shaft with a brazing alloy containing an active metal without forming the metal layer on the ceramic shaft. As the active metal, use may be made of tantalum, aluminum, cerium, titanium, zirconium and the like when ceramic is a nitride; or chromium, tantalum, titanium, zirconium, molybdenum and the like when ceramic is a carbide.

The ceramic material constituting the turbine rotor unit according to the invention is appropriately selected from materials such as silicon nitride, silicon carbide, sialon and the like having a light weight and an excellent high-temperature strength and abrasion resistance and composite materials consisting mainly of such ceramics in accordance with the intended purpose of the turbine rotor unit according to the invention.

As the metallic material constituting the turbine rotor unit according to the invention, use may be made of precipitation hardened alloys and commercially available metallic materials which can be surface hardened by carburizing, nitriding, surface quenching, discharge hardening, plating or the like.

In case of the turbocharger rotor using the turbine rotor unit according to the invention, the surface hardening of the metal shaft enhances the wear resistance of that surface of the metal shaft which contacts with a bearing. When using the precipitation hardened alloy as a material for the metal shaft, the precipitation hardening treatment is carried out after the fixing between the ceramic shaft and the metal shaft. Preferably, the precipitation hardened alloy includes at least one alloy selected from maraging steels, precipitation hardenable stainless steels and precipitation hardenable superalloys.

When the surface hardening of the metal shaft is carried out by nitriding, the metallic material preferably includes at least one chromium-containing alloy selected from stainless steels, nickel-chromium-molybdenum steels, chromium-molybdenum steels, aluminum-chromium-molybdenum steels, alloy tool steels and the like. And also, when the hardening of the metal shaft is carried out by surface quenching, the metallic material preferably includes at least one steel selected from nickel-chromium-molybdenum steels, chromium-molybdenum steels, nickel-chromium steels and chromium steels.

The surface hardening of the metal shaft may be carried out before or after the fixing between the ceramic shaft and the metal shaft. Preferably, the surface hardening is carried out before the finish working on the inner surface of the cylindrical portion of the metal shaft.

Moreover, when the ceramic shaft is fitted into the metal shaft having at its surface a hard and brittle compound layer formed by nitriding, this compound layer can not follow in the deformation of the metal shaft during the fitting, so that cracks are produced in the surface layer. In order to prevent the occurrence of cracks, it is preferable that an unhardened surface zone is formed on a part of the metal shaft surface and subjected to the deformation of the metal shaft produced by fitting the ceramic shaft into the metal shaft.

In the turbine rotor unit according to the invention, when the material of the metal shaft is a precipitation hardened alloy, the hardness of the cylindrical portion is equal to one obtained by precipitation hardening of such an alloy. On the other hand, when the metal shaft is made from a metallic material other than the precipitation hardened alloy, the hardness (Hv) is adjusted to a range of 250–450 by heat treatment. If the particular site of the metal shaft surface is necessary to have a hardness higher than the above defined range, the aforementioned surface hardening treatment is applied to the metal shaft. When the fixing between the ceramic shaft and the metal shaft is carried out by the fitting, if the hardness (Hv) of the cylindrical portion of the metal shaft is less than 250, the tightness between the ceramic shaft and the cylindrical portion is insufficient, while if the hardness (Hv) exceeds 450, the cylindrical portion is apt to be broken during the fitting operation.

FIGS. 1 and 2 show structures of a turbine rotor unit according to the invention for use in turbocharger rotor.

In FIG. 1 is shown a first embodiment of the turbine rotor unit for a turbocharger rotor according to the invention, wherein a main portion of a ceramic shaft 2 integrally united with a ceramic rotor 1 is covered with a cylindrical portion 3 of a metal shaft. The joint portion between the ceramic rotor 1 and the ceramic shaft 2 is rounded at 4 for mitigating the stress concentration therein. The metal shaft is composed of three portions having different diameters, i.e. a portion 5 located adjacent to the ceramic rotor and constituting all elements (not shown) required for attachment and sealing of a lubricant such as an oil slinger, oil sealing groove and the like, a shaft portion 7 supported by a bearing 6 in a bearing unit (hereinafter referred to as a bearing mount shaft) and a shaft portion 8 for securing a compressor rotor. The portions 5 and 7 of the metal shaft constitute the cylindrical portion 3. In the inner surface of the cylindrical portion 3, the inner diameter $D_1$ at the opening side is larger than the inner diameter $D_2$ at the bottom side. Moreover, the ceramic shaft is fixed to the metal shaft at the small diameter side of the cylindrical portion.

The position of the small diameter side of the cylindrical portion is determined so that the fixing portion between the ceramic shaft and the metal shaft is located between portions of the bearing mount shaft 7 contacting with the bearings. A gap 9 is formed between the opening end of the cylindrical portion and the back surface of the ceramic rotor, which has such a size that the tip of the cylindrical portion does not contact with the back surface of the ceramic rotor at the service temperature of the turbine rotor unit according to the invention. If this gap is not existent, the tip of the cylindrical portion pushes the back surface of the ceramic rotor as the temperature of the shaft portion rises under the service conditions because the thermal expansion of the metal shaft is larger than that of the ceramic shaft, whereby the tensile stress may be produced on the ceramic shaft causing it to break.

The inner diameter $D_1$ at the large diameter side of the cylindrical portion is made larger than the diameter of the ceramic shaft, whereby a gap 9a is formed between the inner peripheral surface at the large diameter side of the cylindrical portion and the outer surface of the ceramic shaft for heat insulating purposes.

The turbine rotor unit of the illustrated embodiment may be produced as follows.

First, the turbine rotor 1 and turbine shaft 2 are formed into one body made of silicon nitride. Thereafter, the turbine shaft is worked to a predetermined finished size. Then one end of the metal shaft composed of a precipitation hardened alloy at a non-precipitation hardened state is worked to form the cylindrical portion 3 having such a size that the inner diameter $D_1$ at the opening side is larger than the diameter of the ceramic shaft and the inner diameter $D_2$ at the bottom side is smaller than the diameter of the ceramic shaft. Further, the outer periphery of the metal shaft is roughly worked to substantially its predetermined shape. Thereafter, the ceramic turbine shaft is press-fitted into the small diameter side of the cylindrical portion of the metal shaft at a temperature of not more than the precipitation hardening temperature of the metal shaft and fixed to the metal shaft to produce the turbine rotor unit having a shape as shown in FIG. 1. Then, the turbine rotor unit is heated to the precipitation hardening temperature for a predetermined time to harden the metal shaft and then worked at the outer surface to a predetermined finished size and shape.

In FIG. 2 is shown a second embodiment of the turbine rotor unit for a turbocharger rotor according to the invention, wherein a portion of a ceramic shaft 2 integrally united with a ceramic rotor 1 is covered with a cylindrical portion 3 of a metal shaft.

The ceramic shaft is composed of a portion 10 adjoining the ceramic rotor and having a larger diameter and a portion 2 covered with the cylindrical portion 3 and having a small diameter. The joint area between the large diameter portion 10 of the ceramic shaft and the ceramic rotor and between the large diameter portion 10 and the small diameter portion 2 are rounded at 11 and 12, respectively. On the outer periphery of the large diameter portion 10 of the ceramic shaft is arranged all elements (not shown) required for attachment and sealing of lubricant. The metal shaft is composed of a shaft portion 7 supported by a bearing 6 in a bearing housing (bearing mount shaft) and a shaft portion 8 for securing a compressor rotor. The bearing mount shaft 7 constitutes the cylindrical portion 3. In the cylindrical portion 3, the inner diameter $D_1$ at the opening side is larger than the inner diameter $D_2$ at the bottom side, and also the ceramic shaft is fixed to the metal shaft at the small diameter side of the cylindrical portion.

The small diameter side of the cylindrical portion is located between portions of the bearing mount shaft 7 contacting with the bearings. A gap 13 is formed between the opening end of the cylindrical portion of the metal shaft and the back end surface of the large diameter portion of the ceramic shaft. Since the inner diameter $D_1$ at the large diameter side of the cylindrical portion is larger than the diameter of the ceramic shaft 2, a gap 13a for heat insulation is formed between the inner peripheral surface at the large diameter side of the cylindrical portion and the outer surface of the ceramic shaft 2.

This turbine rotor unit may be produced as follows. That is, the turbine rotor 1 and the turbine shaft are first formed in one body from silicon nitride. Thereafter, the turbine shaft is worked to a predetermined shape and size. Moreover, the particular site of the metal shaft having a hardness adjusted by quenching and tempering is subjected to a surface hardening treatment, if necessary. Then, one end of the metal shaft is worked to form the cylindrical portion having such a size that the inner diameter $D_1$ at the opening side is larger than the diameter of the ceramic shaft 2 and the inner diameter $D_2$ at the bottom side is smaller than the diameter of the ceramic shaft 2.

Next, the outer periphery of the metal shaft is roughly worked to a shape close to a predetermined shape and size. Therefore, the ceramic shaft 2 is press-fitted into the small diameter side of the cylindrical portion 3 at a temperature lower than the tempering temperature of the metal shaft to produce a turbine rotor unit having a shape shown in FIG. 2.

Then, the turbine rotor unit is subjected to a finishing working to the prdetermined shape and size.

The following examples are given in illustration of the invention and are not intended as limitations thereof.

EXAMPLE 1

A tubine rotor of 61 mm in diameter and a ceramic shaft of 9 mm in diameter and 51 mm in length were integrally formed from silicon nitride by a pressureless sintering process. Thereafter, the joint area between the turbine rotor and the ceramic shaft was subjected to a rounding work at a radius of more than 4 mm, while the diameter of the ceramic shaft was reduced to 6 mm, and also the tip of the ceramic shaft was tapered. Additionally, one end of a solution treated precipitation hardenable stainless steel (JIS-SUS 630) having a complete length of 130 mm and a diameter of 20 mm was worked to form a cylindrical portion having a hollow depth of 50 mm, wherein the inner diameter extending from the opening end to a depth of 32 mm was 6.1 mm and the inner diameter extending from a depth of 32 mm to 50 mm was 5.8 mm. Then, the outer periphery of the cylindrical portion of the precipitation hardenable stainless steel was subjected to a working for attaching elements consisting of an oil slinger and an oil sealing groove for attachment and sealing of lubricant and simultaneously worked to a size slightly larger than a finished size as a bearing mount shaft and compressor rotor mounting shaft, whereby a metal shaft was prepared. Thereafter, the ceramic shaft was press-fitted into the cylindrical portion of the metal shaft at 350° C. to produce a turbine rotor unit for a turbocharger having a shape shown in FIG. 1, wherein the turbine rotor was made of silicon nitride and the turbine shaft was made of the precipitation hardenable stainless steel. The turbine rotor unit was subjected to a precipitation hardening treatment at 420° C. for 10 hours and then finish-worked to the predetermined size.

This turbine rotor unit for a turbocharger was placed in a high-temperature rotary testing machine and then a rotation test was performed with combustion gas at 150,000 rpm for 100 hours. No abnormalties were observed.

EXAMPLE 2

A turbine rotor of 61 mm in diameter and a ceramic shaft of 20 mm in diameter and 51 mm in length were integrally formed from silicon nitride by a pressureless sintering process. Thereafter, the ceramic shaft was worked to such a shape that a portion extending from the tip of the ceramic shaft to 34 mm had a diameter of 6 mm and a portion extending from 34 mm to the back surface of the turbine rotor had a diameter of 18 mm, while the joint area between the large diameter portion and the small diameter portion of the ceramic shaft and between the back surface of the turbine rotor and the large diameter portion of the ceramic shaft were rounded to predetermined sizes and also the tip of the ceramic shaft was tapered.

Separately, a rod of aluminum-chromium-molybdenum steel (JIS-SACM 645, hereinafter referred to as a nitrided steel) having a diameter of 10 mm and a length of 115 mm was heated at 930° C. for 1 hour, quenched in water at room temperature and tempered heated at 600° C. for 1 hour, whereby a hardness (Hv) was adjusted to 350.

After the diameter of the rod was reduced to 9.2 mm, an outer surface of a region extending from 16 mm to 34 mm apart from one end of the rod (region A of FIG. 2) was covered with a mild steel cover of 18 mm in length, and then the outer surface of the remaining region of the rod was subjected to an ion nitriding treatment for 20 hours while heating at 550° C. in a mixed gas atmosphere of equal volumes of nitrogen and hydrogen under a pressure of 4 Torr, whereby the non-covered rod surface was hardened. By the ion nitriding treatment under the above conditions, the hardness (Hv) of the nitrided surface was increased from 350 (before the nitriding) to 1100 and the hardness (Hv) at a depth of 0.2 mm from the surface was 700. On the other hand, the region covered with the mild steel cover over a width of 18 mm had the same hardness (Hv) of 350 as that before the nitriding and no formation of nitride at its surface.

Then, one end of the nitrided steel rod having the unhardened surface portion of 18 mm in width was worked to form a cylindrical portion having a hollow depth of 33 mm, wherein the inner diameter extending from the opening end to a depth of 17 mm was 6.1 mm and the inner diameter extending from a depth of 17 mm to 33 mm was 5.8 mm, whereby a metal shaft was prepared. Thereafter, the ceramic shaft was press-fitted into the cylindrical portion of the metal shaft at 350° C., during which the deformation of the cylindrical portion was restricted to the unhardened surface region, whereby a turbine rotor unit comprising the turbine rotor made of silicon nitride and the turbine shaft made of silicon nitride and nitrided steel was produced. Then, the outer periphery of the turbine shaft was worked to the predetermined shape for attaching elements (not shown) for attachment and sealing of lubricant and as a bearing mount shaft of 9.0 mm in diameter and a compressor rotor mounting shaft of 6.4 mm in diameter to produce a turbine rotor unit for a turbocharger having a shape shown in FIG. 2, wherein the hardness (Hv) of the surface portion of the bearing mount shaft contacting with the bearing was not less than 700.

After the turbine rotor unit for turbocharger was assembled into a high-temperature rotary testing machine, the rotation test was made with combustion gas at 150,000 rpm for 100 hours. No abnormalties were observed.

Moreover, when the ceramic shaft was fixed to the metal shaft by the joining method, no deformation of the metal shaft occurred in the fixed portion, so that the use of unhardened band was not required in the surface of the fixed portion of the metal shaft.

EXAMPLE 3

Turbine rotor units for a turbocharger having the same structures as in Examples 1 and 2 were subjected to high-temperature rotation test, provided that a part of the ceramic shaft was broken intentionally. In the turbine rotor unit of Example 1, even if the ceramic shaft was broken, there was caused no leakage of lubricant into the turbine housing. In the turbine rotor unit of Example 2, the leakage of lubricant into the turbine housing occurred slightly, which was not a serious impedient against practical use.

EXAMPLE 4

A rod of nickel-chromium-molybdenum steel (JIS-SNCM 420) having a diameter of 10 mm and a length of 115 mm was heated at 850° C. for 0.5 hour, oil quenched and tempered at 500° C. for 1 hour, whereby the hardness (Hv) of the rod was adjusted to 370. After the diameter of the rod was reduced to 9.2 mm, a region of the rod extending to a distance of 50 mm from one end thereof was subjected to a high frequency induction quenching up to a depth of 2 mm from the outer surface, whereby this region was hardened. Then, the region was tempered at 200° C. for 1 hour to adjust the hardness (Hv) of the surface hardened region to 430. Thereafter, the surface hardened rod was worked to form a cylindrical portion having a hollow depth of 33 mm, wherein the inner diameter extending from the opening end of the surface hardened region to a depth of 17 mm was 6.1 mm and the inner diameter extending from a depth of 17 mm to 33 mm was 5.8 mm, whereby a metal shaft was prepared.

The ceramic shaft provided with the ceramic turbine rotor having the same shape and size as in Example 2 was press-fitted into the cylindrical portion of the metal shaft at 350° C. to produce a turbine rotor unit comprising the turbine rotor made of silicon nitride and the turbine shaft made from silicon nitride and nickel-chromium-molybdenum steel.

Then, the bearing mount shaft and compressor rotor mounting shaft of the turbine rotor unit were worked to diameters of 9.0 mm and 6.4 mm, respectively, whereby there was produced a turbine rotor unit for turbocharger having a shape shown in FIG. 2, wherein the hardnesses (Hv) of the metal shaft surface and the metal shaft center were 430 and 370, respectively.

In the shaft part of the turbine rotor unit, the ceramic shaft was broken at a torsional torque of 3.0 kg.m as measured at 350° C.

EXAMPLE 5

An end of a solution treated precipitation hardenable stainless steel (JIS-SUS 630) having a total length of 130 mm and a diameter of 20 mm was worked to form a cylindrical portion having a hollow depth of 50 mm, wherein the inner diameter extending from the opening end to a depth of 32 mm was 6.1 mm and the inner diameter extending from a depth of 32 mm to 50 mm was 5.8 mm. The outer periphery of the cylindrical portion of the precipitation hardenable stainless steel was worked for attaching elements for attachment and sealing of lubricant such as an oil slinger, an oil sealing groove and the like, while the bearing mount shaft and compressor rotor mounting shaft were worked to sizes larger by 0.2 mm in diameter than the finished sizes, whereby a metal shaft was prepared.

Thereafter, the ceramic shaft provided with the ceramic turbine rotor having the same shape and size as in Example 1 was press-fitted into the cylindrical portion of the metal shaft at 350° C. to produce a turbine rotor unit for a turbocharger comprising the turbine rotor made of silicon nitride and the turbine shaft made of the precipitation hardenable stainless steel and having a shape shown in FIG. 1.

The turbine rotor unit was subjected to an ion nitriding treatment while heating at 420° C. in a mixed gas atmosphere of equal volumes of nitrogen and hydrogen under a pressure of 4 Torr and simultaneously to a precipitation hardening treatment. As a result, the hardness (Hv) inside the metal shaft was increased from 320 (before the heating) to 450, and also the hardness (Hv) of the metal shaft surface was increased to 600.

In the shaft part of the turbine rotor unit, the ceramic shaft was broken at a torsional torque of 3.5 kg.m as measured at 350° C.

Moreover, it is apparent from the spirit of the invention that the structure and material combination of the turbine rotor unit and method of producing the same are not restricted to those disclosed in the above examples.

As mentioned above, in the turbine rotor unit according to the invention, the ceramic shaft is fixed to a portion of the cylindrical portion arranged on the metal shaft, while the gap for heat insulation is existent between the inner peripheral surface of the cylindrical portion located and the outer surface of the ceramic shaft and also the fixing portion between the ceramic shaft and the metal shaft is located in the bearing housing and forcebly cooled by the lubricant, so that the temperature rising of the fixing portion or temperature gradient in an axial direction thereof does not result and a stable bonding strength is obtained. Because of the presence of the gap, the tip of the cylindrical portion of the metal shaft can be extended near the back surface of the turbine rotor to arrange elements for attachment and sealing of lubricant onto the outer periphery of the metal shaft, or can be located from the bearing portion toward the side of the turbine rotor. As a result, even if the ceramic shaft is broken, no leakage of lubricant into the turbine housing occurs.

Thus, the turbine rotor units according to the invention are excellent in their response and safety by utilizing characteristics of ceramic materials such as thermal resistance, abrasion resistance, high strength, low specific gravity and the like, so that they are useful as a turbine rotor units for turbochargers.

What is claimed is:

1. A turbine rotor unit comprising:
a bearing housing;
a ceramic rotor comprising a front surface and back surface;
a ceramic shaft integral with said back surface of said ceramic rotor, said ceramic shaft having an outer peripheral surface;
a metal shaft having a first longitudinal end, a hollow cylindrical portion with a first inside peripheral surface and second inside peripheral surface, said first inside peripheral surface having a diameter which is larger than an inside diameter of said second inside peripheral surface, said first inside peripheral surface being located closer to said back surface of said ceramic rotor than said second inside peripheral surface, a second portion of said outer peripheral surface of said ceramic shaft being fixed to said metal shaft at said second inner peripheral surface, thereby forming a contact surface area between said metal shaft and said ceramic shaft, such that a longitudinally extending radial gap exists between a first portion of said outer peripheral surface of said ceramic shaft and said first inside peripheral surface, wherein a portion of said longitudinal extending radial gap is located between two bearing members within said bearing housing, and said contact surface area is located completely within said bearing housing.

2. The turbine rotor unit of claim 1, wherein said contact surface area extends between two bearings which support the metal shaft in said bearing housing.

3. The turbine rotor unit of claim 1, wherein a longitudinal gap is provided between the first longitudinal end of the metal shaft and the back surface of the ceramic rotor.

4. The turbine rotor unit of claim 1, wherein sealing and attachment means are located on an outer peripheral surface of the metal shaft.

5. The turbine rotor unit of claim 1, wherein sealing and attachment means are located on an outer peripheral surface of the ceramic shaft.

6. The turbine rotor unit of claim 1, wherein at least a portion of said metal shaft is hardened by a process selected from the group consisting of precipitation hardening, nitriding and high frequency induction quenching.

7. The turbine rotor unit of claim 1, wherein said ceramic rotor and said ceramic shaft consist essentially of an element selected from the group consisting of silicon nitride, silicon carbide and sialon.

8. The turbine rotor unit of claim 1, wherein said metal shaft consists essentially of a metal selected from the group consisting of stainless steel, nickel-chromium molybdenum steel, chromium-molybdenum steel, aluminum-chromium-molybdenum steel, maraging steel, precipitation hardenable stainless steel and precipitation hardenable super alloys.

9. A turbine rotor unit comprising:
a bearing housing;
a ceramic rotor comprising a front surface and a back surface;
a ceramic shaft integral with said back surface of said ceramic rotor, said ceramic shaft having an outer peripheral surface;
a metal shaft having a first longitudinal end, a hollow cylindrical portion with a first inside peripheral surface and a second inside peripheral surface, said first inside peripheral surface having a diameter which is larger than an inside diameter of said second inside peripheral surface, said first inside peripheral surface being located closer to said back surface of said ceramic rotor than said second inside peripheral surface, a second portion of said outer peripheral surface of said ceramic shaft being fixed to said metal shaft at said second inner peripheral surface, thereby forming a contact surface area between said metal shaft and said ceramic shaft, such that a longitudinally extending radial gap exists between a first portion of said outer peripheral surface of said ceramic shaft and said first inside peripheral surface, said gap having an axial length which is greater than a diameter of said ceramic shaft, and said contact surface area is located completely within said bearing housing.

10. The turbine rotor unit of claim 9, wherein said contact surface area extends between two bearings which support the metal shaft in said bearing housing.

11. The turbine rotor unit of claim 9, wherein a longitudinal gap is provided between the first longitudinal end of the metal shaft and the back surface of the ceramic rotor.

12. The turbine rotor unit of claim 9, wherein sealing and attachment means are located on an outer peripheral surface of the metal shaft.

13. The turbine rotor unit of claim 9, wherein sealing and attachment means are located on an outer peripheral surface of the ceramic shaft.

14. The turbine rotor unit of claim 9, wherein at least a portion of said metal shaft is hardened by a process selected from the group consisting of precipitation hardening, nitriding and high frequency induction quenching.

15. The turbine rotor unit of claim 9, wherein said ceramic rotor and said ceramic shaft consist essentially of an element selected from the group consisting of silicon nitride, silicon carbide and sialon.

16. The turbine rotor unit of claim 9, wherein said metal shaft consist essentially of a metal selected from the group consisting of stainless steel, nickel-chromium, molybdeum steel, chromium-molybdenum steel, aluminum-chromium-molybdeum steel, maraging steel, precipitation hardenable stainless steel and precipitation hardenable super alloys.

* * * * *